May 26, 1936.   G. I. RHODES   2,041,862
SAFETY SYSTEM FOR PIPE LINES
Filed Nov. 18, 1930   2 Sheets-Sheet 1
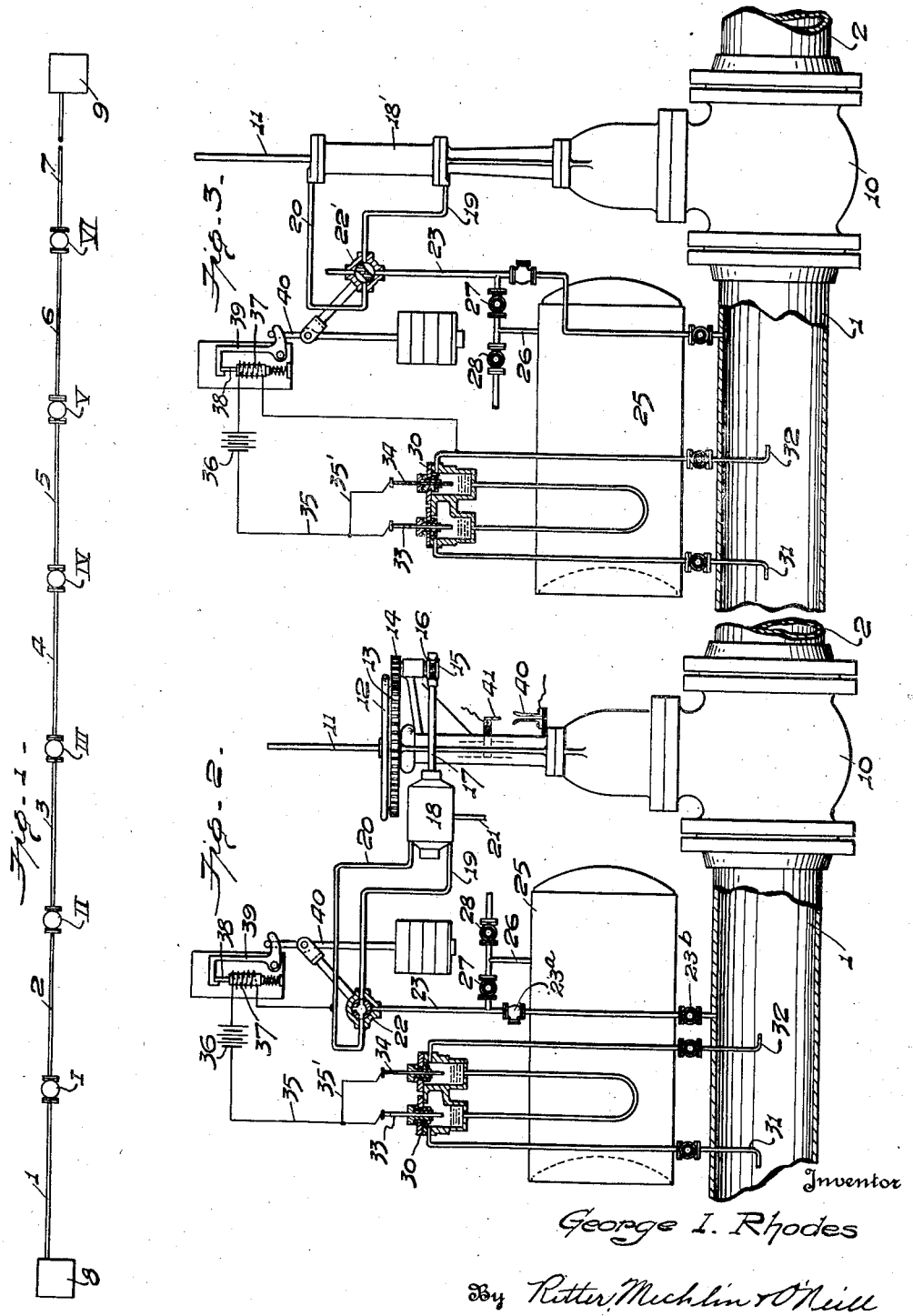
Inventor
George I. Rhodes
By Ritter, Mechlin & O'Neill
Attorneys May 26, 1936. G. I. RHODES 2,041,862
SAFETY SYSTEM FOR PIPE LINES
Filed Nov. 18, 1930 2 Sheets-Sheet 2
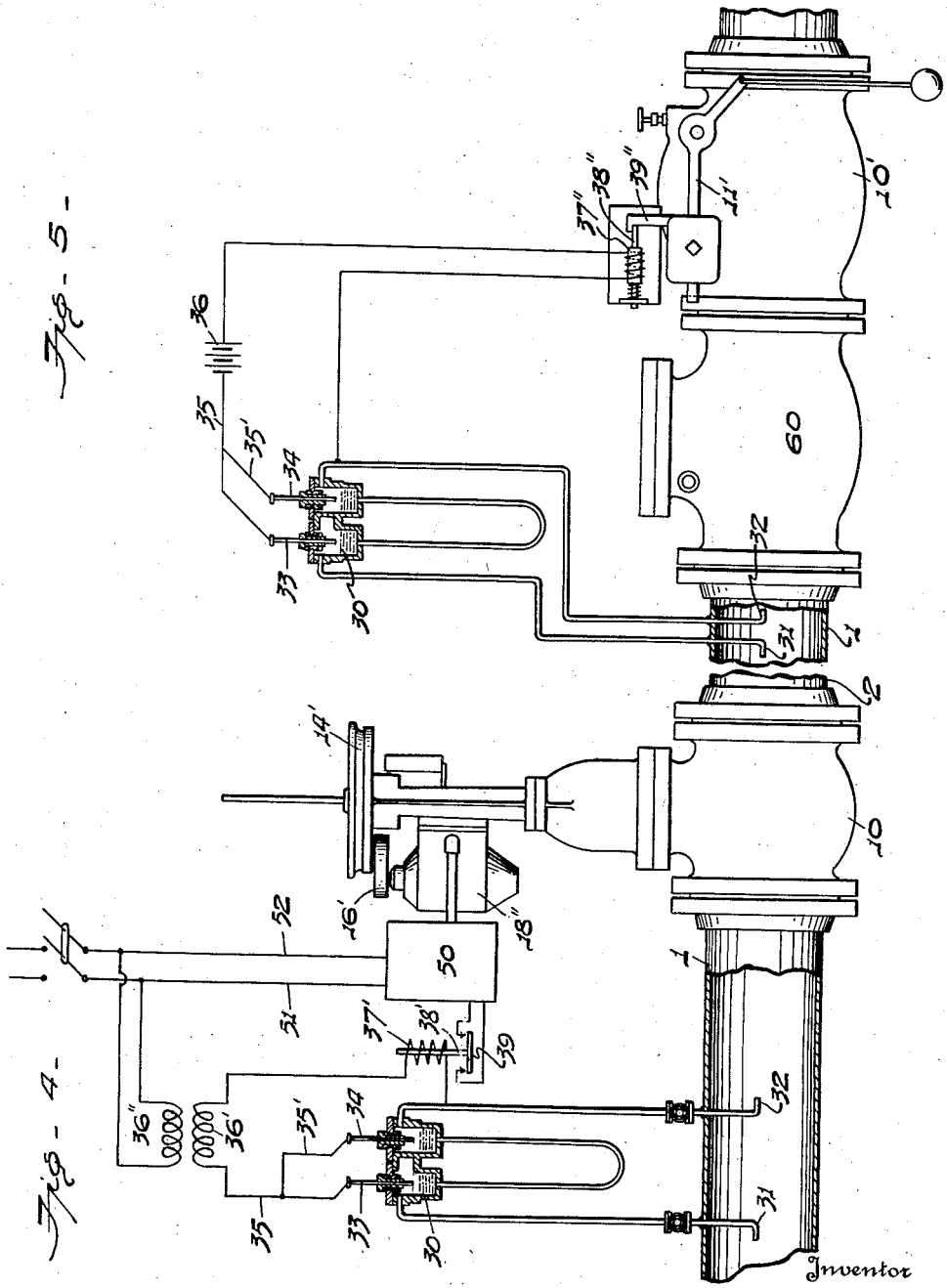
Inventor
George I. Rhodes
By Ritter, Muchlin & O'Neill
Attorneys Patented May 26, 1936

2,041,862

UNITED STATES PATENT OFFICE 2,041,862

SAFETY SYSTEM FOR PIPE LINES

George I. Rhodes, Glen Ridge, N. J., assignor, by direct and mesne assignments, of one-half to Ford, Bacon & Davis, Inc., New York, N. Y., a corporation of New Jersey, and one-half to Phillips Petroleum Company, Bartlesville, Okla., a corporation of Delaware Application November 18, 1930, Serial No. 496,507

7 Claims. (Cl. 137—153)

The invention relates to safety systems for pipe lines conveying liquids or gases under pressure and has for its object to provide means for stopping the flow to a break or a serious leak in the line, by means of automatic valves which are arranged to divide the line into isolatable sections, the closure of the automatic valves being effected by an excess in or a reversal of pressure resulting from the flow of the fluid in the line at the valves, the valve at the up-stream end of any section in which the break or the leak occurs being closed by an excess of such pressure and the closure of the valve at the down-stream side being controlled or operated by a reversal of such pressure.

The invention is illustrated in the accompanying drawings, in which:—

Fig. 1 is a diagrammatic view of a pipe line extending from the source of supply to a remote point.

Figs. 2, 3, 4, and 5 are side elevations, partly in section, illustrating various types of automatic valves and the associated means for effecting the closing of the same, as installed in the pipe line at intervals to divide the line into isolatable sectons.

For the purpose of exemplifying a practical application of the invention, the same will be described as applied to a high pressure natural gas line, although it will be understood that the invention is applicable to pipe lines generally in which the fluid is conveyed under pressure. It is now common practice to sectionalize high pressure natural gas lines and, in fact, pipe lines generally by means of hand operated valves interposed in the lines at intervals of ten miles more or less. When a break or a serious leak occurs in the line, it is necessary to send out men to locate the break or leak and to close the valves at each end of the section in which the break or leak is found and thereby conserve as far as possible the gas stored in the line on either side of the damaged section. If the trouble is located soon enough and cleared by closing the proper valves, it is possible to maintain essential service by drawing upon the gas stored in the portions of the line on both sides of the impaired section. The time required to locate and clear a break is, however, frequently too great to permit the continuation of satisfactory service. The present invention, especially as applied to natural gas lines, provides means for promptly and automatically isolating the broken section of the line, thus conserving to the maximum the gas stored in the line and insuring better service than would be possible otherwise.

Referring to the drawings, Fig. 1 illustrates a pipe line which may be either the main line extending from the gas field to the market, or a branch line extending from the main line to the market. As indicated in the drawings, 8 is the source of supply and 9 is the point of delivery between which the pipe line extends, the line being divided into sections 1, 2, 3, etc. by means of cut-off valves I, II, III, IV, etc., which valves in the normal operation of the line are fully open. Each of the valves is of the automatic type adapted to be closed by power driven motors or by gravity actuated means, the closing operation of any one of the valves being effected by abnormal pressure conditions resulting from the flow of the fluid in the pipe at the valve, which abnormal pressure conditions are reflected in differential pressure gauges of any standard type connected to the pipe line adjacent the respective valves, said pressure gauges controlling electric relay circuits, which, in turn, control the motors which close the valves.

A typical automatic valve, together with the accessories for effecting the closing of the latter upon the development of abnormal pressure conditions, such as would be produced by a break or a leak in the section of the pipe on either side of the valve, is illustrated in Fig. 2, in which 10 indicates the valve, which may be of the gate type, the stem 11 of which is provided with the usual hand wheel 12 for manual operation and a large gear wheel 13, which is connected by a pinion 14 and worm wheel 15 with a worm 16 on the shaft 17 of a fluid pressure motor 18, which latter may be of any approved type, the motor preferably receiving its operating fluid pressure by way of pipes 19 and 20, which are adapted to be alternately connected by a three way valve 22 and a pipe 23 which is tapped in the main pipe line 1 and in which are located check valve 23a and hand valve 23b. The exhaust of the motor is through pipe 21. The adjustment of the valve 22 will control the operation of the motor 18 in either direction; that is to say, either to open or close the valve 10.

In order to provide a reserve supply of fluid pressure for operating the motor 18 in case the pressure in the pipe line is insufficient, a storage tank 25 is connected to the pipe line by a pipe 26 coupled to pipe 23 and provided with a hand valve 27, so that, through the operation of the check valve 23a, a body of gas or similar fluid under pressure may be maintained in the tank for emergency use substantially at the maximum pressure of the pipe line. The pipe 26 may be extended to a source of fluid pressure independent of that in the pipe line or the storage tank 25, this section of the pipe 26 being controlled by a hand valve 29.

Connected with the pipe line adjacent each valve 10 is an electric contact making differential fluid pressure gauge 30, which may be of any approved type and which is conventionally illustrated, in the present instance, by way of example, as a reversible electric contact making flow meter of a well known type, the chambers of which contain a body of mercury which is forced in one chamber or the other by way of the U tube connecting the bottoms of the chambers, according to the predominating pressure in the respective chambers. The upper portion of each chamber above the mercury is connected to the pipe line by a section of piping terminating in Pitot tubes 31 and 32, respectively, so disposed as to deliver the static and the positive and negative velocity pressures due to the flow of the fluid medium in the pipe lines to the respective chambers of the flow meter. Fitted in the tops of the respective chambers of the flow meter 30 by means of insulating bushings are adjustable contacts 33 and 34, which, in turn, are connected by leads 35 and 35' to the coils of an electromagnet or solenoid 37, a battery 36 or other source of electrical energy being interpolated in the conductor 35, the other end of which beyond the magnet is grounded, preferably on one of the connecting pipes. The core 38 of the solenoid is normally projected by the usual spring and engages the hooked end of a pivoted latch 39, which normally supports a weighted rod 40 to which the lever which operates the valve 22 is pivotally connected. When the several parts occupy the positions illustrated in Fig. 2, the valve 22 closes the connection between the motor 18 and the source of power for operating the latter, but, when the trip 39 is released, the weighted rod 40 moves the valve 22 to open connection between the source of fluid pressure by way of pipe 23 to motor 18 to operate the latter to close the valve 10 through the reducing gear train hereinbefore explained.

The up-stream Pitot tube 31 is directed against the normal flow of fluid in the line and the down-stream Pitot tube 32 points or is directed in the opposite direction with the flow of the fluid or gas in the line. When any gas or fluid is flowing in the main pipe line, the pressure of the up-stream Pitot tube 31 will be greater than the static line pressure by an amount corresponding to the velocity head of the fluid or gas and the pressure in the down-stream Pitot tube will be less than the static pressure in the line by a like amount. Accordingly, the mercury in the up-stream chamber of the flow meter will be depressed by a distance corresponding to the velocity head of the fluid or gas flowing through the line and the mercury in the down-stream chamber of the flow meter will be elevated by a like amount. In the usual practice, the velocity head of the gas is equivalent to the pressure of from one to ten inches of water, depending upon the size of the pipe and the volume and pressure of the gas flow.

As stated, the automatic valves are located in the pipe line at predetermined distances for the purpose of isolating the section of the pipe line between any two valves in which a break or a serious leak occurs. Assume that, in the illustrative diagram represented in Fig. 1, the flow in the pipe line is from the source of supply 8 to the point of delivery 9 and that a break or a serious leak occurs in the line between valves III and IV, which will immediately result in a large increase in the flow of gas in the line between the source of supply and the break or leak and a large reduction in pressure in the line near the break, which low pressure will gradually extend back into the line toward the source of supply as the gas therein is depleted by the leak. There will also be a reversal of the flow of gas in the line from the other or delivery end of the line through the valve IV toward the break, if the leak is large, but, in the event of a smaller leak, only when the valve III is closed. The elevation of the mercury in the flow meter located adjacent valve III will increase above the normal elevation by an amount proportional to the square of the quantity of gas flowing and inversely proportional to the absolute pressure of the gas at the valve. Assume that the velocity of flow is doubled at the valve as the result of the leak and the pressure is reduced one-half, both of which phenomena are within the range of common experience, then the mercury in the flow meter adjacent valve III will be elevated a distance eight times the normal elevation due to the regular flow in the pipe line. It is evident, therefore, that, by the proper adjustment of the flow meter contacts, the electric relay circuit controlling the closing operation of the valve 10 will never be closed at either of the contacts so long as the normal flow through the pipe line is maintained, but that the flow meter will be effective in closing the relay circuit, which, in turn, will bring about a closing of the valve 10, when any abnormal increase in flow and/or reduction of the pressure in the line at the valve occurs, due to a leak or break in the section of the pipe line adjacent the valve. Under the conditions referred to, when a break or leak occurs in section 4 of the line, there will be a reversal of flow at valve IV, such reversal being assured after the valve III has been closed and this reversal of flow at the valve IV will cause the mercury in the up-stream chamber of the flow meter located adjacent valve IV to rise sufficiently to close the electric relay circuit controlling the closing of said valve IV, so that the latter valve will be closed and the entire section of the pipe line between the valves III and IV will be isolated. However, the gas or other fluid in the pipe line on either side of the isolated section will be available for use. The setting of the contact in the flow meter to respond to a reversal of flow in the pipe line may be for a much smaller elevation of the mercury than will be required in the case of the companion contact in the same flow meter for direct flow, since, in the normal operation of the system, there is no reversal of the flow in the pipe line.

The gas stored in the lines between the valve III and the source of supply will serve to defer the increase in the flow and the reduction in the pressure at valves II and I for a length of time which is relatively great as compared with the time required to close the valves III and IV to isolate the section in which the leak or break has occurred, so that the isolation of said section will be effected before sufficient velocity head is developed at valves II and I to close these valves and, therefore, the operation of the system will be completely selective.

If the velocity head obtained by using two Pitot tubes is too great for the flow meter that is selected for use in any given case, one of the Pitot tubes may be replaced by a square ended tube, whereby the meter deflection will be reduced by one-half. This deflection or the rise of the mercury in the particular type of flow meter shown can be still further reduced by turning the other Pitot tube to an angle with the flow of the fluid in the pipe line. It is obvious, of course, that instead of Pitot tubes, plain tubes may be tapped into the pipe line at suitable distances apart, a distance of about one hundred feet separating the tubes being the equivalent of one Pitot tube in the case of a relatively large pipe line. The principal advantage of using the Pitot or equivalent tubes is that they will produce no reduction in the line pressure. Instead of the Pitot tubes or the square ended tubes, it will be apparent that other differential pressure devices, such as orifice plates and flanges, or Venturi tubes, may be installed in the pipe line adjacent the respective automatic valves, but the Pitot tubes or the square ended tubes placed as indicated are preferred, because they are inexpensive and do not introduce any additional friction in the line and, therefore, cause no economic loss in the transport of the fluid medium through the pipe line.

It will be understood that the automatic valves may be opened and closed manually or, when they are of the type illustrated in Fig. 2, the motor may be actuated in either direction to open or close the valve by manual control of the supply to the motor. Obviously, also the actuation of the motor for operating any valve, either in its opening or closing, may be effected by any suitable remote control system, several of which are well known in the art.

It may also be found desirable to install a signalling system for indicating the closing of any valve or valves in the pipe line, thereby notifying the attendant, in charge, of the particular section of the pipe line in which the leak or break has occurred, so that no time may be lost in locating and repairing the break. This signalling system may take the form of any standard fire alarm system with suitable contacts carried by the valves and closed when the valves are closed, or, in the alternative, a suitable fire alarm system associated with a telegraph or telephone service line with which the pipe line is usually provided.

In the case of a fluid being transported by the pipe line instead of a compressed gas, or a gas under relatively low pressure, there will also be an increase in flow due to a break in the line, but such increase will be less than in the case of a gas under high pressure.

In Fig. 3, there is illustrated an alternative form of automatic valve, but the system is otherwise the same as that involving the use of valves of the type shown in Fig. 2. In the modification, conventionally illustrated in Fig. 3, the only essential difference is in the type of the motor employed to open and close the valve 10, the motor 18' being a fluid pressure cylinder motor, which receives its actuating fluid pressure medium from the pipe line, from the storage tank 25 or from an extraneous source, the operation of the motor being controlled by a rotary valve 22', which is controlled in its operation to effect closing of the valve by the same type of electric relay and trip mechanism, as in Fig. 2.

The modification shown in Fig. 4 involves the substitution of an alternating current electric motor 18" for opening and closing the valve 10, the shaft of the motor being connected to the operating wheel 14' of the valve by suitable reducing gearing 16', the motor being supplied from leads 51, 52 connected to the usual controlling panel 50, the automatic closing of the valve being controlled by a switch 39 actuated by a solenoid 37', the circuit of which includes the secondary 36' of a transformer, which is associated with a primary 36" connected across the leads 51, 52, the circuit of the solenoid 37' being completed when the mercury in either of the chambers of the differential flow gauge rises sufficiently high to engage the contact 33 or 34 mounted in said chambers.

In the modification shown in Fig. 5, the automatic valve 10' is of a well known type of emergency stop valve commonly used in steam practice that is normally closed by a weighted lever 11' and is held in open position by a hooked detent 39" secured to the lever and normally engaged by the core 38" of a solenoid 37", which solenoid is included in circuit with the battery 36 and the contacts 33 and 34 of the flow meter, in substantially the same manner as in Figs. 2 and 3. When such an automatic gravity closed valve is employed, there is associated therewith a check valve 60, which is held normally in open position by the normal flow of the fluid in the pipe line, but which closes automatically upon the reversal of flow in the line.

What I claim is:

1. The combination with a cut-off valve for a pipe line, of means including a weighted lever for closing the same, and mechanism adapted to be connected to the line and responsive to changes in pressure small as compared with the operating pressure of the line and operable by excess in or a reversal of a pressure resultant from the flow of a fluid in the line to render effective the valve closing means, said mechanism including a chambered member containing an electrical conducting fluid.

2. In pipe line controlling means disposed at intervals in a fluid conducting pipe line to divide said line into isolable sections, the combination with a normally open cut-off valve for the pipe line, of means for closing said valve, and means for inducing a valve closing operation of said valve closing means in response to changes in pressure small as compared with the operating pressure of the line and resulting from a change either in the velocity or in the direction of flow of the fluid in the pipe line, said means for inducing said valve closing operation including an electric circuit and means providing a plurality of chambers each containing an electrical conducting fluid, the fluid in each chamber constituting circuit closing means operable to induce a valve closing operation of said valve closing means.

3. In pipe line controlling means disposed at intervals in a fluid conducting pipe line to divide said line into isolable sections, the combination with a normally open cut-off valve for the pipe line, of means for closing said valve, and means actuated by pressure differentials of the fluid in the line adjacent said valve and responsive to changes in pressure small as compared with the operating pressure of the line and operable by change of pressure resulting from a change either in the velocity or in the direction of flow of the fluid in the line for inducing a valve closing operation of said valve closing means, said means for inducing said valve closing operation including an electrical circuit, means providing a plurality of chambers each containing an electrical conducting fluid adapted to close said circuit to induce a valve closing operation of said valve closing means, and tubes respectively connecting said chambers to the pipe line.

4. In pipe line controlling means disposed at intervals in a fluid conducting pipe line to divide said line into isolable sections, the combination with a motor operated cut-off valve for the pipe line, of means for inducing a closing operation of said valve in response to change of pressure resulting from a change either in the velocity or in the direction of flow of the fluid in the pipe line, said means including a contact making flow meter having a plurality of electric contacts and connected to the pipe line and responsive to and operable by change of pressure resulting from a change either in the velocity or in the direction of flow of the fluid in the line, and an electric relay circuit controlled by said meter and operating to induce closure of said motor operated cut-off valve when said circuit is closed through either of said contacts.

5. The combination with a cut-off valve for pipe lines, of electrically controlled means for effecting the closing of said valve, and fluid pressure actuated means connected to the pipe line and responsive to changes in pressure small as compared with the operating pressure of the line and operable to effect closure of said valve upon a predetermined excess in or reversal of pressure resulting from the flow of fluid in the line, said pressure actuated means including a plurality of electrical circuit closing devices each constituting means for inducing a valve closing operation of said electrically controlled valve closing means.

6. In pipe line controlling means disposed at intervals in a fluid conducting pipe line to divide said line into isolable sections, the combination with a normally open cut-off valve for the pipe line, of means for closing said valve, and means for inducing a valve closing operation of said valve closing means in response to changes in pressure small as compared with the operating pressure of the line and resulting from a change either in the velocity or in the direction of flow of the fluid in the pipe line, said means for inducing said valve closing operation of said valve closing means including electric circuit means and a plurality of electrical contacts for actuating said circuit means.

7. In pipe line controlling means disposed at intervals in a fluid conducting pipe line to divide said line into isolable sections, the combination with a normally open cut-off valve for the pipe line, of means for closing said valve, and means for inducing a valve closing operation of said valve closing means in response to changes in pressure small as compared with the operating pressure of the line and resulting from a change either in the velocity or in the direction of flow of the fluid in the pipe line, said means for inducing said valve closing operation of said valve closing means including a differential pressure gage connected to the pipe line, electric relay circuit means energizable to effect a valve closing operation of said valve closing means, and a plurality of electrical circuit closing devices disposed in said circuit means and actuated by said differential pressure gage.

GEORGE I. RHODES.